United States Patent [19]

Wilger et al.

[11] 4,241,623
[45] Dec. 30, 1980

[54] VERTICAL DRIVE MECHANISM FOR A CUTTING APPARATUS

[75] Inventors: John F. Wilger, Honolulu; Gregory S. Nakano, Pearl City; Tadao Uyetake, Honolulu; Stephen Orillo, Jr., Wahiawa; Teikichi Higa, Pearl City, all of Hi.

[73] Assignee: The United States of America as represented by the Secretary of the Navy, Washington, D.C.

[21] Appl. No.: 45,883

[22] Filed: Jun. 6, 1979

Related U.S. Application Data

[62] Division of Ser. No. 861,911, Dec. 19, 1977, Pat. No. 4,175,471.

[51] Int. Cl.³ .......................... B23B 41/2; B23C 1/20; F16H 1/34
[52] U.S. Cl. ............................... 74/765; 74/424.8 R; 74/750 R; 74/841; 173/146; 408/129
[58] Field of Search ................. 74/765, 764, 784, 789, 74/424.8 R, 424.8 C, 841, 750; 173/146, 145; 408/129; 409/179; 51/245

[56] References Cited

U.S. PATENT DOCUMENTS

| | | | |
|---|---|---|---|
| 2,777,339 | 1/1957 | Hess | 51/245 X |
| 2,876,653 | 3/1959 | Meyer | 74/424.8 R |
| 3,640,147 | 2/1972 | Fantoni | 74/424.8 R |

Primary Examiner—Z. R. Bilinsky
Attorney, Agent, or Firm—Richard S. Sciascia; Ervin F. Johnston

[57] ABSTRACT

A vertical drive mechanism is provided for a cutting apparatus. The cutting apparatus can be used for in place machining of a valve seat which may include an annular turntable adapted to be rotatably mounted on the valve above the valve seat. A feed shaft is mounted through the turntable so as to be rotatable therewith, and a bottom of the feed shaft is adapted to receive a cutter for machining the valve seat. The vertical drive mechanism is mounted on the feed shaft and includes a nut threaded on the feed shaft and a gear combination. The gear combination may include a first portion which is fixedly connected to the nut, a second portion which operatively engages the first gear portion, and a third portion which operatively engages the second gear portion, the third gear portion being mounted for rotatable slidable friction engagement about the nut. With this arrangement, rotation of the turntable causes the vertical drive mechanism to rotate therewith as a unit, however, upon stopping the third gear portion, the latter will rotate relative to the turntable and the remainder of the vertical drive mechanism to turn the second gear portion, then the first gear portion, then the nut, then drive the feed shaft vertically.

8 Claims, 10 Drawing Figures

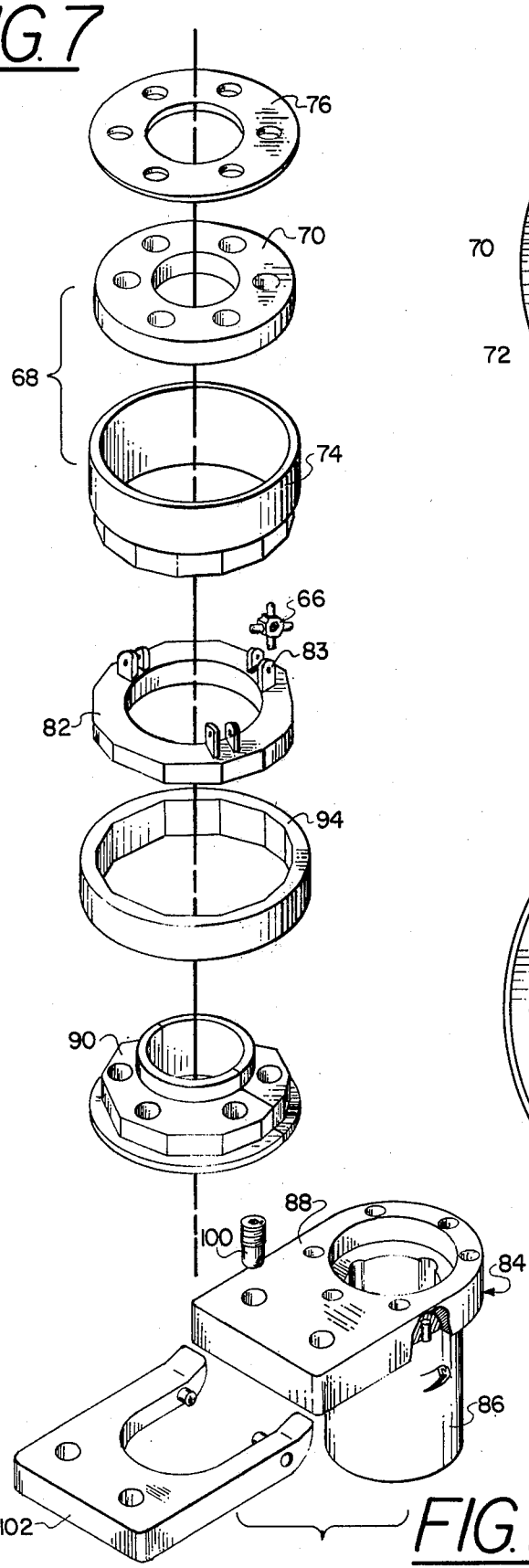
FIG. 7
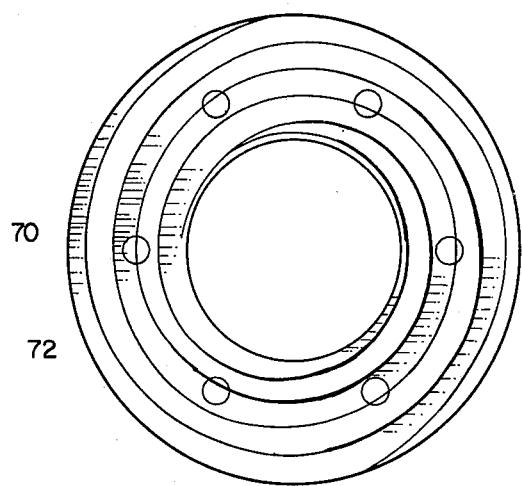
FIG. 8
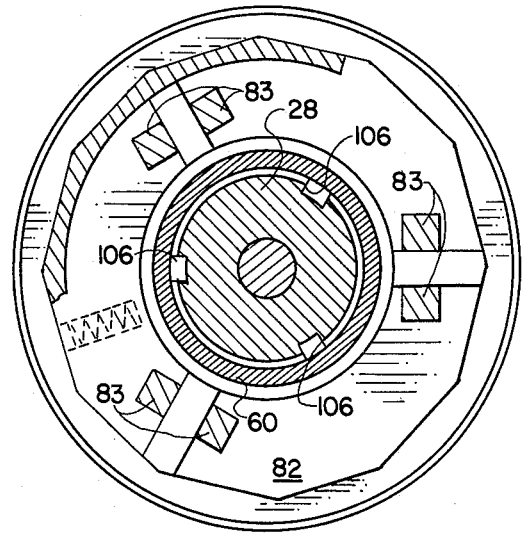
FIG. 9
FIG. 10

VERTICAL DRIVE MECHANISM FOR A CUTTING APPARATUS

STATEMENT OF GOVERNMENT INTEREST

The invention described herein may be manufactured and used by or for the Government of the United States of America for governmental purposes without the payment of any royalties thereon or therefor.

This is a division, of application Ser. No. 861,911 filed Dec. 19, 1977, now U.S. Pat. No. 4,175,471.

BACKGROUND OF THE INVENTION

All steam powered plants, regardless of whether nuclear, coal, or oil burning, are equipped with main steam cut out valves. During the overhaul of these plants, regardless of whether they are located on submarines, surface crafts, or in industrial complexes, the main steam cut out valves are periodically inspected and repaired to maintain gas tight integrity. Normally, the seal ring bearing areas become defective due to constant operational pressure, thereby requiring a repair to conform them to the manufacturer's operational tolerances. The refurbishment of worn out ring bearing areas is normally performed by the employment of hand tools and/or by removing the valve from the system and repairing it in a shop with stationary shop equipment. The refurbishment of ring bearing areas by the employment of hand tools is slow, tedious, and expensive with the end product being of low quality. The employment of stationary shop equipment requires many extra man-hours to remove and reinstall the valve system.

SUMMARY OF THE INVENTION

The present invention provides a vertical drive mechanism for an in place cutting apparatus. The cutting apparatus can be used for machining worn out ring bearing areas or other internal surfaces of valves. The cutting apparatus may include a turn table which is adapted to be rotatably mounted on the valve above the internal valve area. A feed shaft is mounted through the turntable so as to be rotatable therewith, and a bottom end of the feed shaft is adapted to receive a cutter for machining the internal valve surface. The vertical drive mechanism is mounted on the feed shaft and includes a nut, which is threaded on the feed shaft, and a gear combination. The gear combination may include a first portion which is fixedly connected to the nut, a second portion which operatively engages the first gear portion, and a third portion which operatively engages the second gear potion, the third gear portion being mounted for rotatable, slidable frictionable rotation about the nut. With this arrangement, rotation of the turntable will cause the vertical drive mechanism to rotate therewith as a unit, however, upon stopping the third gear portion, the latter will rotate relative to the turntable and the remainder of the vertical drive mechanism to turn the second gear portion, thence the first gear portion, thence the nut, and thence drive the feed shaft vertically.

OBJECTS OF THE INVENTION

An object of the present invention is to provide a vertical drive mechanism for a cutting apparatus, the cutting apparatus being used for in place machining of an internal valve surface.

A further object is to provide a vertical drive mechanism for a cutting apparatus which can be easily operated for in place machining of an internal surface of a valve.

Yet another object is to provide a vertical drive mechanism for an in place valve cutting apparatus wherein the vertical drive can be simply and efficiently changed from one drive speed to another.

Yet another object is to provide a dual speed vertical drive mechanism for a machining apparatus.

These and other objects of the invention will become more readily apparent from the ensuing description when taken together with the drawings.

DESCRIPTION OF THE DRAWINGS

FIG. 7 is an exploded isometric view of various elements of the vertical drive mechanism of the cutting apparatus.

FIG. 8 is an enlarged bottom view of one of the elements of the vertical drive mechanism illustrated in FIG. 7.

FIG. 9 is a view taken along plane IX—IX of FIG. 3.

FIG. 10 is an isometric view of a mechanism for locking the cutting apparatus in place on top of a valve.

DESCRIPTION OF THE PREFERRED EMBODIMENTS

Figure 1:
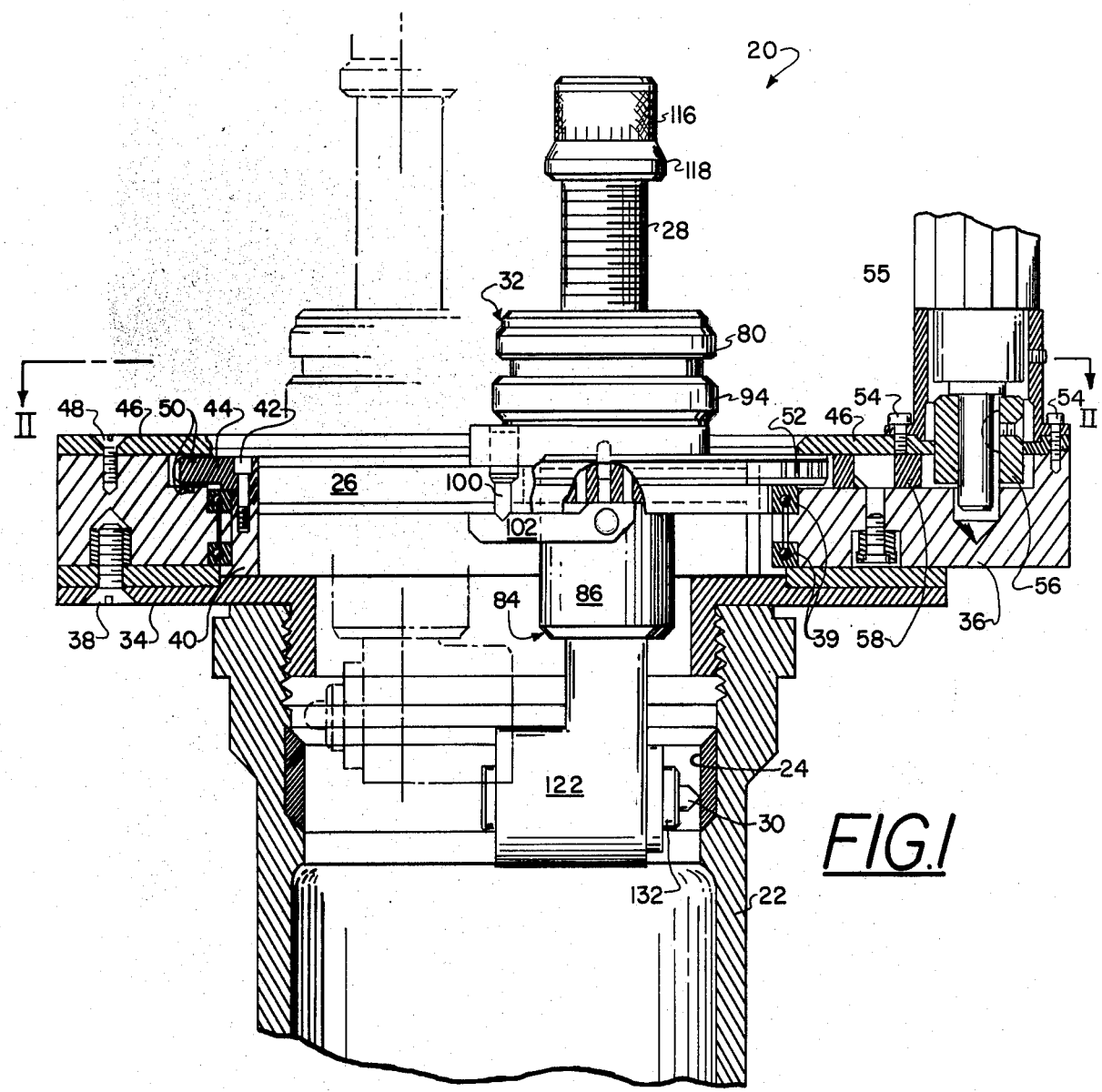
FIG. 1 is a vertical cross section of the entire cutting apparatus mounted on a valve for machining an internal ring bearing surface thereof.

Referring now to the drawings, wherein like reference numerals designate like or similar parts throughout the several views, there is illustrated in FIG. 1 an in place cutting apparatus 20 which is mounted on a valve 22 for machining an internal surface of the valve, such as a seal ring bearing surface 24. When these surfaces become worn beyond manufacturer's tolerances, they must be built up with metal and once again machined to the proper dimensions. The cutting apparatus 20 may include a turntable 26 which is adapted to be rotatably mounted on the valve 22 above the internal valve surface to be worked on. A feed shaft 28 is mounted through the turntable so as to be rotatable therewith. A bottom end of the feed shaft is adapted to receive a cutter 30 for machining the internal valve surface. Means 32, which will be described in detail hereinbelow, are mounted on the feed shaft 28 for vertically driving the feed shaft.

The cutting apparatus 20 is supported in position over the valve 22 by an adapter 34 which may be threaded into the top portion of the valve. The adapter 34 may come in various sizes depending upon the size of the valve to be machined. An annular housing 36 may be secured to the adapter 34 by a series of bolts 38, one of which is illustrated in FIG. 1. The turntable 26 may be rotatably mounted in the housing 36 by roller bearings 39, the latter being retained in place by a ring 40 and bolts 42, one of the bolts being illustrated in FIG. 1. A turntable 26 may have a top portion 44 which projects within an annular recess of the housing 36. An annular cover 46 may be secured to the housing 36 by bolts 48, one of which is illustrated in FIG. 1, above the turntable projection 44. Nylon wipes 50 may be provided between the turntable projection 44 and the bottom surface of the cover 46 and the bottom of the housing recess for protecting the roller bearings 38 from dirt and debris.

The outer perimeter of the turntable projection 44 is a spur gear 52 which is driven by an air motor 55. The air motor 55 is vertically mounted on the housing 36 by bolts 54. A pinion gear 56 is mounted to the output shaft of the motor and the pinion gear 56 meshes with an idler gear 58 which is rotatably mounted in the housing 36. The idler gear 58 in turn meshes with the spur gear 52 so that operation of the motor 55 will cause the turntable 26 to rotate within the housing 36 above the internal surface 24 of the valve.

VERTICAL DRIVE MECHANISM

Figure 4:
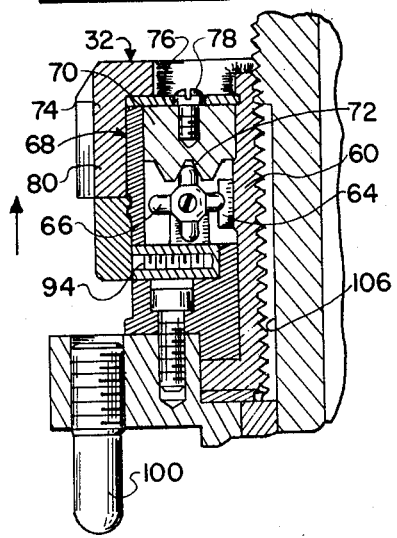
FIG. 4 is a vertical cross section of a portion of the vertical drive mechanism.
Figure 5:
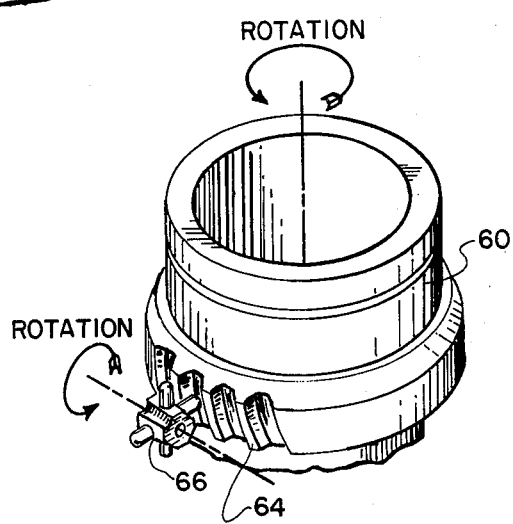
FIG. 5 is an isometric view of specific internal components of the drive mechanism illustrated in FIG. 4.
Figure 3:
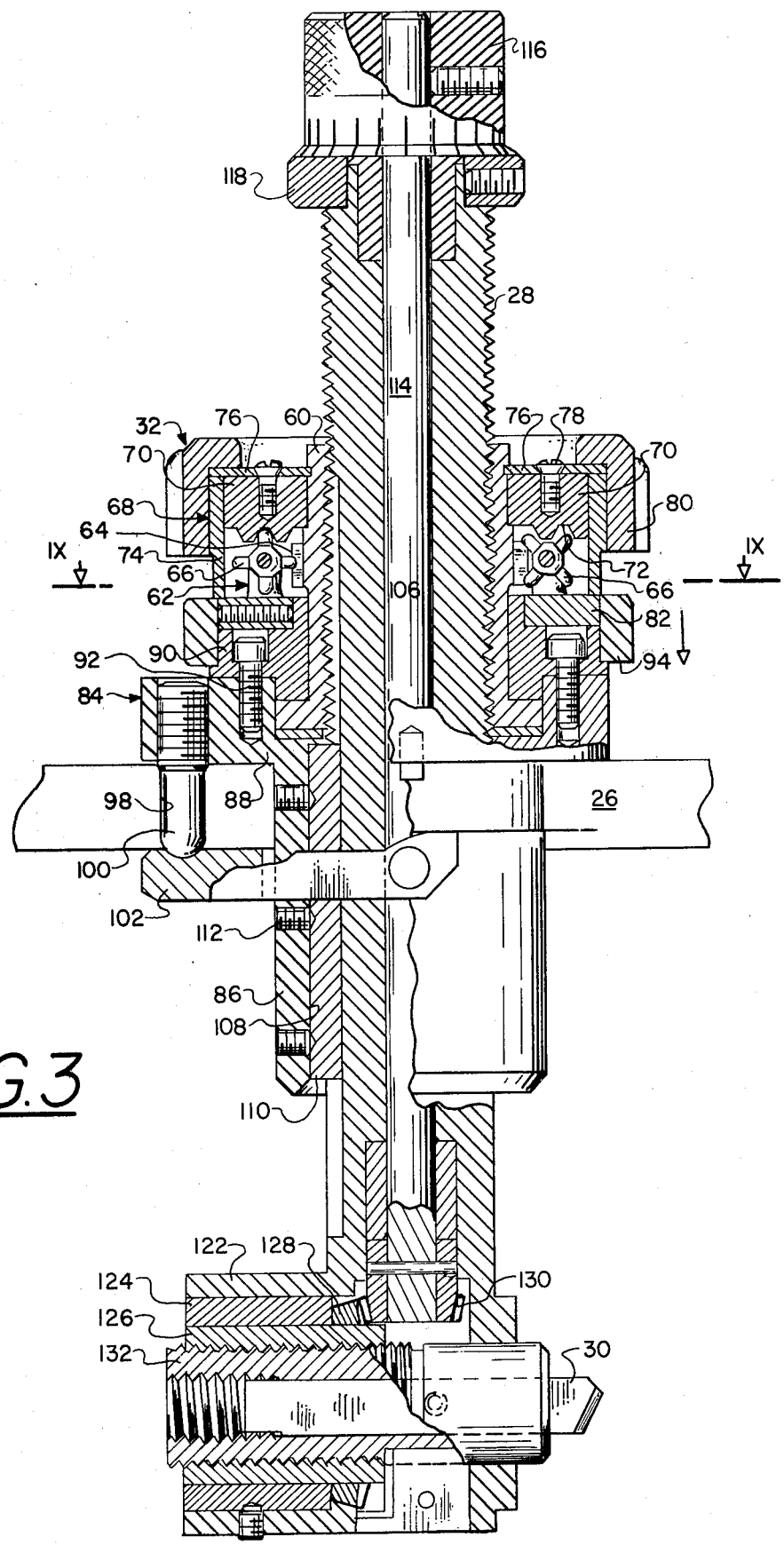
FIG. 3 is a vertical cross-sectional view of the vertical drive mechanism mounted on a feed shaft of the cutting apparatus.

As illustrated in FIG. 3, the vertical drive means or mechanism 32 includes nut means 60 which is threaded on the feed shaft 28 and gear means which is generally illustrated at 62. The gear means may include a first portion 64 which is fixedly connected to the nut means 60. This first gear means portion may be a helical gear. The gear means 62 may further include a second portion 66 which operatively engages the helical gear 64. The second gear means portion 66 may be a plurality of star wheels. The gear means 62 may still further include a third gear means portion 68 which operably engages the star wheel 66. As illustrated in FIGS. 7 and 8 the third gear means portion 68 may include an annular ring 70 which has a spiral groove 72 in its bottom end for receiving the teeth of the star wheels 66. The ring 70 is mounted for rotatable, slidable, frictional engagement about the nut means 60 so that it will normally rotate therewith, however, it can be stopped by the grasping by one's hand. With this arrangement, rotation of the feed shaft 28 will cause the vertical drive means 32 to rotate therewith as a unit, however, upon stopping the ring 70 of the third gear means portion 68 the latter will rotate relative to the feed shaft 28 and the remainder of the vertical drive means so as to turn the star wheel 66, thence the helical gear 64, thence the nut means 60, and thence drive the feed shaft 28 vertically. The vertical advance of the feed shaft depends upon the pitch of the threads between that shaft and the nut 60 as well as the gearing relationships between the spiral groove 72, the star wheels 66, and the helical gear 64. This arrangement can be designed such that the feed shaft 28 will move in the order of 0.0024 inches with the feed shaft 28 advancing one pitch distance of its threads each time the cutter 30 makes a 360° rotation. As illustrated in FIG. 4, the third gear means 68 may further include a sleeve 74 which can be force fitted on the outer perimeter of the ring 70. In assisting the vertical retention of the third gear means 68 to the nut means 60 a split ring retainer 76 and bolts 78 may be utilized. Stoppage of the third gear means 68 may be facilitated by mounting an annular rubber hand grip 80 about the sleeve 74 so that an operator can easily retain the third gear means 68 with finger pressure.

The second gear means portion 66 may also include means 82 for holding the star wheels for rotation thereon. As illustrated in FIG. 7, the holding means 82 may include a ring which has vertical, spaced apart projections 83 for pin supporting the star wheels 66. As will be described in more detail hereinafter, the holding means or ring 82 is mounted for rotatable, slidable, frictional engagement about the nut means 60. Accordingly, when the holding means or ring 82 is stopped the star wheels 66 are likewise stopped causing the feed shaft 28 to advance at a rate which is according to the pitch of the threads interconnecting the nut means 62 to feed shaft 28. This can be designed to advance the feed shaft as much as 0.050 inches per 360° rotation of the cutter 30.

Means 84 are provided for supporting the nut means 60 for vertical retention thereon and rotation thereabout. The support means 84 may include a bottom tubular portion 86 and a top flange portion 88 and a split ring retainer 90 which may be connected to the top flange portion 88 by volts 92. It is the split ring retainer 90 that the holding means 82 may be mounted to for the aforementioned rotatable, slidable, frictional engagement about the nut means 60.

As illustrated in FIGS. 3 and 7, collar means 94 may be vertically slidable on the following components: (1) The split ring retainer 90 of the support means; (2) the holding means 82 for the star wheels 66; and (3) the sleeve 74 of the third gear means 68. As illustrated in FIGS. 3 and 4, when the collar 94 is in a down position (see FIG. 3) the star gear holding means 82 is locked to the split ring retainer of the support means, however, when the collar 94 is in an up position (see FIG. 4) the holding means 82 is locked to the sleeve 74 of the third gear means portion 68. As illustrated in FIG. 7, the locking function may be accomplished by providing an outer perimeter surface of each of the split ring retainer 90 of the support means, the holding means 82 of the star wheels 66, and the sleeve 74 of the third gear means with a polygonal shape, such as the duo hexogonal shape illustrated in FIG. 7. In turn, the collar 94 may have an inner surface which is correspondingly polygonal and which slidably mates with the polygonal surfaces of the above described components. With this arrangement, stoppage of the third gear means portion 68 with the collar 94 in the down position will cause the feed shaft 28, the support means 86, and all of the vertical drive mechanism 32 except the third gear means portion 68 to continue to rotate with the turntable 26. This will cause the star wheels 66 to rotate because of the relative motion between the spiral groove 72 and the teeth of the star wheels. The star wheels 66 in turn operate on the helical gear 64 which will cause the nut means 60 to turn and thence drive the feed shaft 28 vertically. As stated hereinabove, this advance can be made quite small, in the order of 0.0024 inches per 360° rotation of the cutter 30 or of the turntable 36. However, if the third gear means portion 68 is stopped with the collar 94 in the up position, as illustrated in FIG. 4, the star gear holding means 82 is now locked to the third gear means portion 68 and will be likewise stopped therewith. This means that the star wheels 66 are stopped which in turn stops the helical gear 64 and the nut means 60. This, in turn, causes the feed shaft 28 to advance vertically at a faster rate according to the pitch of the threads between the feed shaft 28 and the nut means 60. This can be in the order of 0.050 inches per 360° revolution of the cutter 30 or the turntable 26. It should be understood that reference to stopping various components of the vertical drive means 32 is made relative to the support means 84, the feed shaft 28, the nut means 60, as well as the remainder components of the vertical drive mechanism 32. In this connection, it should be understood that while these relative motions are described these entire assemblies are rotating about the work piece because of their mounting on the turntable 26, which mounting will be discussed next.

Figure 2:
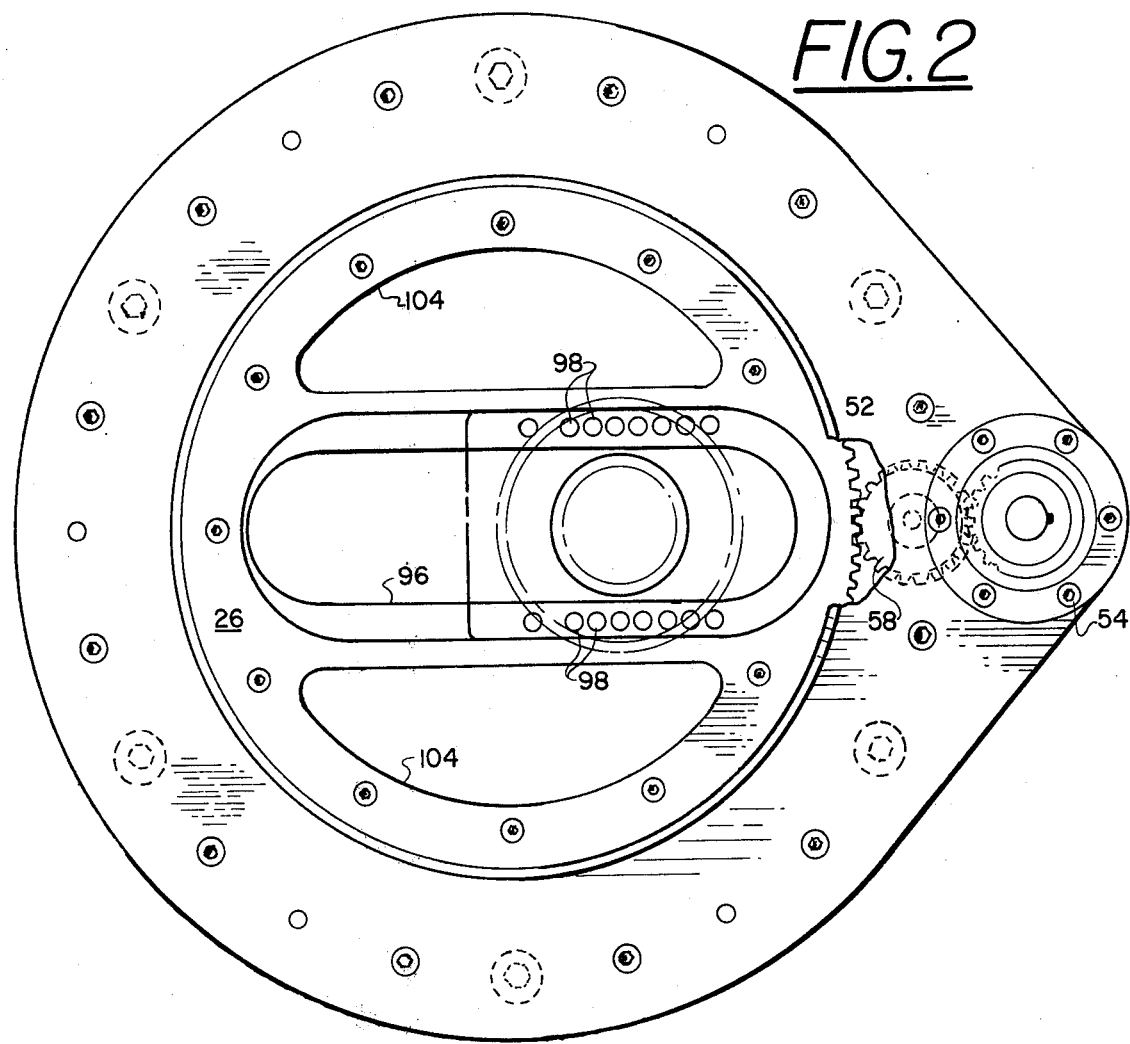
FIG. 2 is a view taken along plane II—II of FIG. 1 with the vertical mechanisms removed.

The mounting of the support means 84 on the turntable 26 may be accomplished by providing the turntable with an opening 96, as illustrated in FIG. 2, which extends from the center thereof radially outwardly for receiving the bottom tubular portion 86 of the support means. Preferably, the opening 96 extends across the turntable in both directions from the center thereof. Along a side of the opening 96, and preferably along both sides of the opening, are a plurality of spaced apart apertures 98 so that the support means 84 and consequently the vertical drive mechanism 32 may be selectively laterally positioned on the turntable 26. As illustrated in FIG. 3, the top flange portion 88 of the support means may rest on the turntable above the apertures 98 and may have threaded pins 100 which extend through the flange portion and into the apertures 98 at the selected positioning. For small valves the drive mechanism would be positioned close to the center of the turntable 26 while the machining of large valves would require the drive mechanism to be positioned outwardly from the center thereof. As illustrated in FIGS. 3 and 10, a yoke 102 may be fitted to the tubular portion 86 of the support means for locking the support means in place and assisting in rigid support to the turntable 26. As illustrated in FIG. 2, the turntable may be provided with additional openings 104 on each side of the central opening 96 for viewing the cutting operation of the cutter 30 within the valve 22. In order to enable vertical movement of the feed shaft 28 relative to the support means 84, the feed shaft 28 and the tubular portion 86 of the support means may be provided with vertical slots 106 and 108, respectively. A key 110 may be mounted in these slots and may be retained therein by set screws 112.

Figure 6:
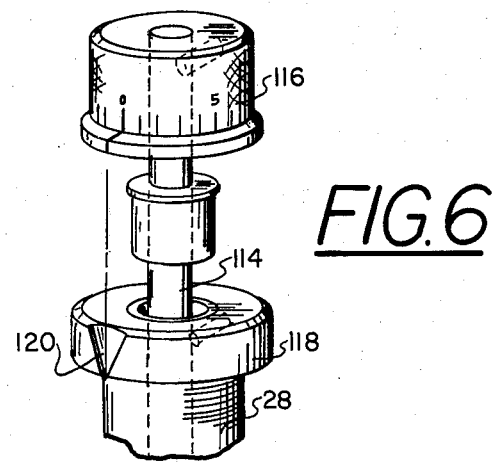
FIG. 6 is an exploded isometric view of a mechanism for horizontally driving the cutting elements of the cutting apparatus.

A horizontal drive mechanism may also be mounted on the support means 84. The vertical drive mechanism may include the feed shaft 28 being tubular with a rod 114 extending therethrough. At the top of the rod 114 there may be mounted a calibrated knob 116, and just below the knob there may be mounted a collar 118 with a mark 120, as illustrated in FIG. 6. The bottom of the feed shaft 28 may be provided with a horizontally extending housing 122 which is open at both ends. A bearing 124 may be mounted in the housing 122 for receiving an internally threaded hub 126 which has a bevel gear 128. The bottom of the rod 114 may be provided with a bevel gear 130 which meshes with the bevel gear 128 for driving the hub 126. A tool holder 132 is threaded in the hub 126 and holds the cutter tool 30 for performing the cutting operation on the valve 22. Accordingly, turning of the knob 116 will cause the cutter 30 to advance or retract from the work piece as desired.

OPERATION OF THE INVENTION

In order to machine the ring bearing surface 24 of the valve 22 an adapter 34 of the appropriate size is threaded into the top of the valve, as illustrated in FIG. 1. This will place the annular housing 36 and the turntable 26 above the work piece. Operation of the motor 54 will rotate the turntable 26 above the work piece. Depending upon the size of the valve 22, the support means 84 is located in the appropriate lateral position on the turntable 26 by pins 100 which extend into apertures 98. Rotation of the turntable causes the support means 84, the feed shaft, and the vertical drive means 32 to rotate therewith, with the cutter 30 being selectively positioned in relationship to the ring bearing area 24. All components are in a neutral position as far as the movement of the cutter 30 is concerned when the support means 84 is rotating with the turntable 26. However, turning of the knob 116 will cause the cutter 30 to be selectively positioned horizontally. When it is desired to move the cutter 30 vertically in a slow mode the collar 94 is located in a down position, as illustrated in FIGS. 1 and 3, and the hand grip 80 is stopped by an operator. This in turn causes the star wheels 66 to rotate relative to the helical gear 64, thence causing the nut 60 to rotate, and thence driving the feed shaft 28 vertically to slowly reposition the cutter 30. If it is desired to advance the feed shaft 28 and correspondingly the cutter 30 rapidly in the vertical mode the collar 94 is slipped to the up position, as illustrated in FIG. 4, and the hand grip 80 is once again stopped by the hand of an operator. The stopping of the star wheels 66 by this operation in turn stops the helical gear 64 and the nut 60 relative to the feed shaft 28 thereby causing the feed shaft 28 and the cutter 30 to advance rapidly in the vertical mode. With proper design the slow mode vertical advance of the cutter can be in the order of 0.0024 inches per 360° revolution of the turntable 26, and the fast mode vertical advance of the cutter can be in the order of 0.050 inches per 360° revolution of the turntable 26.

Obviously, many modifications and variations of the present invention are possible in the light of the above teachings, and, it is therefore to be understood that the invention may be practiced otherwise than as specifically described.

What is claimed is:

1. A vertical drive mechanism for a cutting apparatus wherein the cutting apparatus has a threaded feed shaft which is adapted to be supported for rotation about an axis which is laterally spaced from the longitudinal axis of the feed shaft, said vertical drive mechanism comprising:

nut means threadingly supported on the feed shaft; and gear means having: a first gear means portion which is fixedly connected to the nut means, a second gear means portion which is fixed in operative engagement with the first gear means portion, and a third gear means portion which is fixed in operative engagement with the second gear means portion; and said third gear means portion being mounted rotatably in frictional slidable engagement about said nut means so that the frictional engagement of the third gear means portion about the nut means will cause the third gear means portion to rotate with the nut means, however, upon stopping the rotation of the third gear means portion with respect to the nut means, the nut means will frictionally slidably rotate within the third gear means portion, and said gear means being operative, upon rotation of the feed shaft and stopping the rotation of the third gear means, to cause the second gear means to rotate which causes the first gear means and nut means fixed thereto to rotate, and which causes the feed shaft during each revolution to feed vertically.

2. A vertical drive mechanism as claimed in claim 1 including:
the second gear means portion including a star wheel and the third gear means portion having a spiral groove for receiving the teeth of the star wheel.

3. A vertical drive mechanism as claimed in claim 2 including:
the second gear means portion also including means holding the star wheel for rotation thereon; and
the holding means being mounted for rotatable slidable frictional engagement about the nut means,
whereby, upon stopping the holding means and thence the star wheel, the feed shaft will advance at a rate according to the pitch of the threads interconnecting the nut means to the feed shaft.

4. A vertical drive mechanism as claimed in claim 3 including:
means supporting the nut means for vertical retention thereon and rotation thereabouts; and
collar means vertically slidable on the support means, the holding means of the second gear means portion, and the third gear means portion for locking rotative movement of the holding means to the support means in a down position or alternatively locking rotative movement of the holding means to the third gear means portion in an up position.

5. A vertical drive mechanism as claimed in claim 4 including:
an annular resilient hand grip mounted about the third gear means position.

6. A vertical drive mechanism as claimed in claim 5 including:
the feed shaft and the support means each having a vertical slot; and
key means mounted in the slots for enabling slidably vertical movement of the feed shaft on the support means.

7. A vertical drive mechanism as claimed in claim 6 including:
at least a portion of each of the support means, holding means for the star wheel, and the third gear means portion having an outer perimeter surface which is polygonal; and
the collar means having an inner surface which is polygonal and which slidably mates with the polygonal surfaces of said support means, holding means, and third gear means portion.

8. A vertical drive mechanism as claimed in claim 7 including:
means for vertically retaining the third gear means portion to the nut means, but yet allowing said rotatable slidable frictional engagement thereabouts.

* * * * *